United States Patent
Eto et al.

(10) Patent No.: US 6,843,040 B2
(45) Date of Patent: Jan. 18, 2005

(54) IRON POWDER-BASED OXYGEN-ABSORBING PACKAGE AND PRODUCTION METHOD THEREOF

(75) Inventors: Haruaki Eto, Tokyo (JP); Ken Sugimoto, Tokyo (JP); Hidetoshi Hatakeyama, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/729,777

(22) Filed: Dec. 6, 2000

(65) Prior Publication Data

US 2001/0003235 A1 Jun. 14, 2001

(30) Foreign Application Priority Data

Dec. 9, 1999 (JP) .......................................... 11/350376

(51) Int. Cl.[7] .......................... B65B 5/02; B65B 11/00; B65B 51/10; B65B 7/00; B65B 5/10
(52) U.S. Cl. .............................. 53/452; 53/461; 53/463; 53/476; 53/477
(58) Field of Search .......................... 53/452, 461, 463, 53/476, 477; 428/68, 70, 76, 316.6, 317.9, 323, 328, 329, 441.1; 252/188.28, 191

(56) References Cited

U.S. PATENT DOCUMENTS

| | | | | |
|---|---|---|---|---|
| 3,754,700 A | * | 8/1973 | Bonk | 229/62 |
| 3,969,224 A | * | 7/1976 | Cerbo | 209/12 |
| 4,579,223 A | * | 4/1986 | Otsuka et al. | 206/204 |
| 5,972,452 A | * | 10/1999 | Takahasi et al. | 428/40.1 |
| 6,248,690 B1 | * | 6/2001 | Mckedy | 502/406 |

FOREIGN PATENT DOCUMENTS

| | | |
|---|---|---|
| EP | 0864630 | 9/1998 |
| WO | 95/13135 | 5/1995 |

* cited by examiner

*Primary Examiner*—Sheeba Ahmed
(74) *Attorney, Agent, or Firm*—Antonelli, Terry, Stout & Kraus, LLP

(57) ABSTRACT

The oxygen-absorbing package of the present invention is produced by packaging an oxygen-absorbing composition comprising, as an effective component, an iron powder containing a fine iron powder passing through a 200-mesh standard sieve in an amount of 5% by weight or less by an air-permeable packaging material using an automatic filling-packaging machine. By using the above oxygen-absorbing composition, the iron powder is prevented from being partially scattered to attach to the outer surface of the oxygen-absorbing package during the industrial packaging operation using the automatic filling-packaging machine of high productivity, thereby enabling to obtain an oxygen-absorbing package capable of preserving products for a long period of time without contamination and color change during the storage.

15 Claims, No Drawings

IRON POWDER-BASED OXYGEN-ABSORBING PACKAGE AND PRODUCTION METHOD THEREOF

BACKGROUND OF THE INVENTION

1. Field of the Invention

The present invention relates to an oxygen-absorbing package and an industrial production method thereof, and more particularly to an improved process for packaging an iron powder-based oxygen-absorbing composition by an air-permeable packaging material using an automatic filling-packaging machine and an oxygen-absorbing package produced by such a method.

The oxygen-absorbing package according to the present invention can be used in preserving foodstuffs, beverages, cosmetics, daily commodities, pharmaceutical products, etc.

2. Prior Art

The oxygen-absorbing composition containing an iron powder as an effective component has been extensively used to remove oxygen in preserving various oxygen sensitive products such as foodstuffs. The oxygen-absorbing composition has been ordinarily formed into an oxygen-absorbing package by packaging the oxygen-absorbing composition including fine powder by an air-permeable packaging material using an automatic filling-packaging machine.

However, in the industrial process of packaging oxygen-absorbing composition using an automatic filling-packaging machine of high productivity, the oxygen-absorbing composition is likely to attach to the outer surface of the packages, thereby causing deterioration in package appearance and posing safety and hygiene problems. In particular, in a filling-packaging operation using an automatic three-sided seal filling-packaging machine of rotary filling type which is capable of producing three-side sealed packages at a production rate as high as 400 packages or more per minute, each bag made of air-permeable packaging material is filled with the oxygen-absorbing composition including fine powder in a short period of time of 0.15 second or less. During such a filling, a portion of the oxygen-absorbing composition fed into each bag from a filling chute bounce up toward the opening of bag due to the reaction of falling. The bounced-up oxygen-absorbing composition is sandwiched in a sealed portion of the bag opening, thereby causing deterioration in both appearance and sealing strength. Further, the bounced-up oxygen-absorbing composition is scattered out of the bag and attached to the outer surface of the bag, resulting in contamination of products to be preserved such as foodstuffs, pharmaceutical products and cosmetics. The iron powder-based oxygen-absorbing composition attached to the outer surface of the packages forms rusts upon absorbing oxygen, resulting in further deterioration in appearance.

To avoid the above disadvantages, there have been proposed to carefully control the operating conditions of the automatic filling-packaging machine and clean the outer surface of each package with brush or cloth. However, these methods are laborious and costly, and in addition, fail to produce satisfactory effects.

In the view point of oxygen-absorbing ability, fine powder of iron has been preferred, but no further investigation has been given to the size distribution of iron powder or oxygen-absorbing composition in an oxygen-absorbing package.

SUMMARY OF THE INVENTION

Accordingly, an object of the present invention is to solve the above problems and provide an oxygen-absorbing package with minimized attached amount of an oxygen-absorbing composition on the outer surface thereof. Another object of the present invention is to provide an improved industrial method for producing the oxygen-absorbing package with minimized attached amount of an oxygen-absorbing composition on the outer surface thereof.

The inventors have made extensive researches on the relationship between the scattered amount and the particle size of the iron powder, and as a result thereof, have found that the above problems can be solved and the above objects can be achieved by using a granular iron powder having a limited content of fine iron powder. The present invention has been accomplished based on this finding.

Thus, a process for producing an oxygen-absorbing package of the present invention comprises a step of packaging an oxygen-absorbing composition comprising an iron powder as an effective component by an air-permeable packaging material using an automatic filling-packaging machine, wherein the iron powder contains fine iron powder passing through a 200-mesh standard sieve in an amount of 5% by weight or less based on the total weight of the iron powder.

An oxygen-absorbing package of the present invention comprises an oxygen-absorbing composition containing an iron powder as an effective component, the oxygen-absorbing composition being packaged by an air-permeable packaging material, wherein the iron powder contains fine iron powder passing through a 200-mesh standard sieve in an amount of 5% by weight or less based on the total weight of the iron powder. The attached amount of the iron powder on the outer surface of the oxygen-absorbing package is preferably 0.5 mg/m$^2$ or less with respect to the surface area of the oxygen-absorbing package.

DETAILED DESCRIPTION OF THE INVENTION

The oxygen-absorbing composition used in the present invention utilizes the ability of the iron powder to react with oxygen. In the present invention, is used an oxygen-absorbing composition comprising, as an effective component, an iron powder containing fine iron powder passing through a 200-mesh standard sieve in an amount of 5% by weight or less, preferably 3% by weight or less, based on the total weight of the iron powder. Here, the "200-mesh standard sieve" corresponds to the one having a sieve opening of 75 $\mu$m. The average particle size of the iron powder is preferably 100 to 250 $\mu$m. Larger iron powders may make holes in the packaging material or have lower rate of oxygen-absorption. The iron powder containing the coarse iron powder having diameter larger than 500 $\mu$m in an amount of 3% by weight or less is preferable. In the present invention, the problem that a part of the oxygen-absorbing composition fed into a bag from a filling chute bounces up toward the opening of the bag due to the reaction of falling is overcome by reducing the content of fine iron powder passing through a 200-mesh standard sieve. The iron powder used in the present invention contains granular iron powder not passing through a 200-mesh standard sieve in an amount of 95% by weight or higher.

As the iron powder, powders of iron in reduced state are usable. Examples of such iron powders include sponge iron powder (reduced iron powder) prepared by reducing and pulverizing iron ore; electrolytic iron powder prepared by electrically depositing iron from an iron ion-containing solution; atomized iron powder prepared by atomizing molten iron into water or oil; and crushed iron powder prepared by crushing or grinding iron ingots. Of these iron powders, the sponge iron powder (reduced iron powder) and atomized iron powder are preferred in view of their high oxygen adsorptivity, and the sponge iron powder (reduced iron powder) is most preferred.

In the present invention, it is preferred to blend an electrolyte with the iron powder as an auxiliary. The resultant iron powder/electrolyte composite may be also referred to as the iron powder.

The amount of the electrolyte to be blended is preferably 0.1 to 10% by weight, more preferably 0.2 to 4% by weight based on the weight of the iron powder. When the content of the electrolyte is less than the above range, the oxygen absorption speed is lowered. When the content of the electrolyte is more than the above range, a large amount of absorbed moisture covers the surface of the iron powder, resulting in inhibition of the reaction with oxygen.

Examples of the electrolytes as the auxiliary include halides, carbonates, sulfates and hydroxides of metals, or the like. Of these electrolytes, metal halides are preferred. Further, of the metal halides, more preferred are alkali metal halides such as sodium chloride, potassium chloride, sodium bromide, sodium iodide and potassium iodide, and alkaline earth metal halides such as calcium chloride and magnesium chloride. The mixture of the metal halides is also usable.

The electrolyte may be simply blended with the iron powder by mechanical mixing. Preferably, the electrolyte is attached to the surface of the iron powder by spraying an aqueous solution of electrolyte to the surface of the iron powder and the subsequent drying, or by mixing the iron powder and an aqueous solution of electrolyte and the subsequent drying. In the present invention, the method of making the electrolyte attached to the iron powder is referred to as "coating method", and the iron powder having electrolyte attached thus prepared is referred to as "coated iron powder". The coated iron powder is an iron powder/electrolyte composite having a structure in which solid electrolyte directly attaches to the iron powder. In the coating operation, an additive such as a deodorant exemplified by activated carbon or a dispersant may be blended in addition to the electrolyte in a total amount of about 0.1 to 4% by weight based on the iron powder.

In the present invention, the coated iron powder described above is preferably used as the iron powder. Namely, more preferred iron powder is a coated iron powder in which the sponge iron powder (reduced iron powder) or atomized iron powder is coated with alkali metal halide or alkaline earth metal halide. Most preferred is a coated iron powder prepared by coating the sponge iron powder (reduced iron powder) with alkali metal halide.

As mentioned above, the iron powder used in the present invention contains fine iron powder passing through a 200-mesh standard sieve in an amount of 5% by weight or less. The content of the fine iron powder is determined by measuring both the total amount of the iron powder and the amount of the fine iron powder passing through a 200-mesh standard sieve, and dividing the latter by the former. The content of the fine iron powder is obtained from the amount of the powder composed of the iron powder only or the amount of the iron powder/electrolyte composite comprising the iron powder coated with the auxiliary, but the amount of the auxiliary containing no iron powder and the amount of other additives per se are excluded from the calculation of the content.

Like the non-coated iron powder described above, the coated iron powder prepared by coating the iron powder with the electrolyte is also required to contain fine coated iron powder passing through a 200-mesh standard sieve in an amount of 5% by weight or less based on the total weight of the coated iron powder.

The important feature of the present invention resides in the use of the granular iron powder, as the effective component of the oxygen-absorbing composition, which contains fine iron powder passing through a 200-mesh standard sieve in an amount of 5% by weight or less based on the total weight of the granular iron powder when the oxygen-absorbing composition is packaged in an air-permeable packaging material using an automatic filling-packaging machine.

The granular iron powder containing fine iron powder (fine powder) passing through a 200-mesh standard sieve in an amount of 5% by weight or less may be produced by removing the fine powder by screening or the like. There may also be used a granular coated iron powder prepared by coating the iron powder and then removing the fine powder. Also usable is a granular coated iron powder containing fine coated iron powder (fine powder) passing through a 200-mesh standard sieve in an amount of 5% by weight or less, which may be produced by first removing fine powder and then coating the remaining iron powder, followed by, if desired, further removing fine powder again.

The removal of the fine powder may be conducted by, in addition to screening, separation methods utilizing gravity or centrifugal force. In any case, it is required that the content of the fine iron powder passing through a 200-mesh standard sieve is within the range of 5% by weight or less at the time the oxygen-absorbing composition is packaged by the air-permeable packaging material.

The oxygen-absorbing composition used in the present invention may contain, in addition to the iron powder and the electrolyte, various additives such as deodorants exemplified by activated carbon; moistening agents exemplified by diatomaceous earth, zeolite, granulated silica and foamed concrete; dispersants exemplified by alumina, pearlite, ceramic powder, quartz sand, magnesium oxide, calcium oxide, iron oxides (pyrite and red iron oxide), silica powder, magnesium hydroxide, calcium hydroxide and gypsum; carbon dioxide absorbers or generators; and alcohol generators; and a mixture of at least two of the above additives. The moistening agents may be added to supply water to the iron powder when the products being preserved fail to supply the iron powder with enough water to react with oxygen. The addition amount of the additives or additive mixture is not critical and can be easily determined according to the kind of additives and products to be preserved.

In the present invention, the oxygen-absorbing composition is used in the form of oxygen-absorbing package by packaging the oxygen-absorbing composition in an air-permeable packaging material. As the air-permeable packaging materials, there may be used perforated or oxygen-permeable plastic films, non-woven fabrics, papers and laminated sheets thereof. Examples of materials for the plastic films include polyesters, polyamides, polycarbonates and polyolefins. The opposite sealing surfaces of the packaging materials are preferably made of a heat-sealable materials such as polyethylene and polypropylene.

The oxygen-absorbing composition is packaged in the air-permeable packaging material using an automatic filling-packaging machine. The automatic filling-packaging machine continuously produces the oxygen-absorbing packages at a high production speed by sequential steps of heat-sealing the packaging material into bags, feeding the oxygen-absorbing composition from the opening ends of the bags to fill the bags and then closing the opening ends. The automatic filling-packaging machine may be classified into three-sided seal automatic filling-packaging machines, four-sided seal automatic filling-packaging machines, automatic filling pillow packaging machines (stick packaging machines) according to the packaging manners.

The process of the present invention is effective to prevent the iron powder from attaching to the outer surface of the oxygen-absorbing packages due to the scattering of a part of the oxygen-absorbing composition during the packaging operation. This preventing effect is more remarkable when the oxygen-absorbing composition is packaged using the three-sided seal automatic filling-packaging machines, especially the three-sided seal automatic filling-packaging machines of rotary-fling type.

The three-sided seal automatic filling-packaging machines of rotary-filling type are constituted by a plurality of tilting heat-seal bars, metering devices for filler material and filling chutes. These members are all circumferentially arranged around a rotation axis, and bag-making, metering and filling operations are performed while those members are rotated around the rotation axis together with a double-folded gas-permeable packaging material. At the upstream side of the machines, disposed is an apparatus for feeding the air-permeable packaging material and folding it double along its lengthwise direction. At the downstream side of the machines, an apparatus for heat-sealing the openings of bags is disposed. The machines of this type can produce square packaged products having three heat-sealed sides and one crease side in a high productivity of several hundreds to 1,000 or more packages per minute.

The oxygen-absorbing package of the present invention functions as either a water-depending oxygen absorber which absorbs oxygen with the aid of water evaporated from foodstuffs or the like, or a self-reacting oxygen absorber which absorbs oxygen with the aid of water supplied by the moistening agent added to the oxygen-absorbing composition.

In the oxygen-absorbing package of the present invention, the amount of the iron powder attached to the outer surface thereof is 0.5 mg/m$^2$ or less with respect to the surface area of the oxygen-absorbing package. With such a small attached amount, foodstuffs, beverages, cosmetics, daily commodities and pharmaceutical products are suitably preserved without any change in their color even when containing substances which form adducts with iron, such as ascorbic acid, coumalin, tannin, cresol and hinokitiol. Specific examples of such products to be preserved include bread, confectionery and beverages containing a preservative such as ascorbic acid; cosmetics and perfumes scented with coumalin, etc.; soaps containing antibacterial substances such as cresol and hinokitiol; and medical products such as transfusion bags.

The present invention will be described in more detail by way of examples. However, it should be noted that the following examples are illustrative and the present invention is not intended to be limited thereto.

EXAMPLE 1

In an industrial mixer, 100 parts (parts by weight, the same shall apply hereinafter) of sponge iron powder (reduced iron powder; content of fine iron powder passing through a 200-mesh standard sieve: 0.9% by weight), an aqueous solution containing 1.0 part of sodium chloride and 0.4 part of activated carbon were mixed. The resultant mixture was dried by utilizing self-heating and then cooled to obtain a coated iron powder A. A part of the coated iron powder A was sampled and weighed (X part), and then fine powder passing through a 200-mesh standard sieve was collected and weighed (Y part). The content of the fine powder having passed through the 200-mesh standard sieve in the coated iron powder A, (Y/X)×100, was 1.9% by weight.

Using a three-sided seal automatic filling-packaging machine of rotary-filling type manufactured by Topack Co., Ltd., 0.4 g of the coated iron powder A and 0.4 g of a moistening additive B comprising a mixture of 100 parts of zeolite impregnated with 44 parts of 17% by weight saline solution, 5 parts of gypsum and 4 parts of magnesium hydroxide were mixed and packaged in each bag made of an air-permeable packaging film of perforated polyester/perforated polyethylene/oil-resistant paper/perforated polyethylene at a production rate of 520 packages per minute, thereby to obtain a rolled strip of a series of 6000 self-reacting oxygen-absorbing packages each being a three-side sealed package of 40 mm×30 mm square.

The oxygen-absorbing package exhibited a good appearance. Both surfaces of the rolled oxygen-absorbing package (including 6,000 packages) were sufficiently swept with a 50 mm×60 mm gauze over a Petri dish. The dusts collected in the dish and the gauze were placed in a hydrochloric acid, and heated to dissolve the collected dusts and the dusts retained on the gauze. The resultant solution was collected and analyzed by an inductively coupled plasma-atomic emission spectrometer (ICP-AES) 1200VR manufactured by Seiko Denshi Kogyo Co., Ltd. to determine the amount of the iron powder attached to the outer surface of the oxygen-absorbing package. As a result, it was confirmed that the attached amount was 1 mg/roll corresponding to 0.07 mg/m$^2$ with respect to the surface area of the oxygen-absorbing package.

One oxygen-absorbing package from the roll of oxygen-absorbing packages was sealed together with 75 ml of air into an oxygen-barrier bag by heat sealing. The heat-sealed bag was stored at 25° C. in a thermostat. After 12 hours of storage, the oxygen concentration in the bag was less than 0.1% by volume when measured by a zirconia-type oxygen analyzer.

COMPARATIVE EXAMPLE 1

A mixture of 100 parts of atomized iron powder (content of fine iron powder passing through a 200-mesh standard sieve: 45% by weight) and an aqueous solution containing 0.4 part of sodium chloride was dried and then cooled to obtain a coated iron powder Z, which contained fine coated iron powder passing through a 200-mesh standard sieve in an amount of 50% by weight based on the total weight of the coated iron powder Z.

The same packaging procedure as in Example 1 was repeated except that the coated iron powder Z was used instead of the coated iron powder A, thereby obtaining a rolled strip of a series of self-reacting oxygen-absorbing packages each being a three-side sealed package of 40 mm×30 mm square.

Iron rusts were noticed in appearance on the surface of some oxygen-absorbing packages. The measured amount of the iron powder attached to the outer surface of the rolled oxygen-absorbing agent package (including 6,000 packages) was 20 mg/roll, corresponding to 1.4 mg/m$^2$ with respect to the surface area of the oxygen-absorbing packages.

EXAMPLE 2

Using a three-sided seal automatic filling-packaging machine of rotary-filling type manufactured by Topack Co., Ltd., 0.4 g of the coated iron powder A and 0.6 g of a dispersing additive C comprising alumina were packaged in each bag made of an air-permeable packaging film of perforated polyester/polyethylene/oil-resistant paper/perforated polyethylene at a production rate of 420 packages per minute, thereby to obtain a rolled strip of a series of water-depending oxygen-absorbing packages each being a three-side sealed package of 40 mm×40 mm square.

The obtained oxygen-absorbing package exhibited a good appearance. The measured amount of the iron powder attached to the outer surface of the rolled oxygen-absorbing package (including 6,000 packages) was 3 mg/roll, corresponding to 0.16 mg/m$^2$ with respect to the surface area of the oxygen-absorbing package.

One oxygen-absorbing package from the roll of oxygen-absorbing packages and an absorbent cotton impregnated with 10 g of water were sealed with 75 ml of air into an oxygen-barrier bag by heat sealing. The heat-sealed bag was stored at 25° C. in a thermostat. After 12 hours of storage, the oxygen concentration in the bag was less than 0.1% by volume when measured by a zirconia-type oxygen analyzer.

COMPARATIVE EXAMPLE 2

The same packaging procedure as in Example 2 was repeated except that the coated iron powder Z was used instead of the coated iron powder A, thereby obtaining a rolled strip of a series of water-depending oxygen-absorbing packages each being a three-side sealed package of 40 mm×40 mm square.

Iron rusts were noticed in appearance on the surface of some oxygen-absorbing packages. The measured amount of the iron powder attached to the outer surface of the rolled oxygen-absorbing agent package (including 6,000 packages) was 30 mg/roll, corresponding to 1.6 mg/m$^2$ with respect to the surface area of the oxygen-absorbing packages.

EXAMPLE 3

A hinokitiol-containing soap having one piece of oxygen-absorbing package prepared in Example 1 thereon was sealed with 100 ml of air in a high gas-barrier, stretched nylon/polyvinylidene chloride/polyethylene packaging bag, thereby preparing a plurality of packaged soaps, which were stored at 25° C. After 30 days of storage, the soap and the oxygen-absorbing package in each bag were visually observed to determine whether or not any changes occurred. As a result of the observation, no color change and no contamination were detected on all the soaps and the oxygen-absorbing packages. Specifically, the soaps were slightly colored yellow before packaging, but showed no further color change thereafter.

COMPARATIVE EXAMPLE 3

A hinokitiol-containing soap having one piece of oxygen-absorbing package prepared in Comparative Example 1 was sealed with 100 ml of air in a high gas-barrier, stretched nylon/polyvinylidene chloride/polyethylene packaging bag. The packaged soaps were stored in the same manner as in Example 3. After 30 days of storage, the soap and the oxygen-absorbing package in each bag were visually observed to determine whether or not any changes occurred. As a result of the observation, no further yellowing of the soaps was observed, but reddish brown spots were observed on 10% of the soaps.

According to the process of the present invention, the ion powder is prevented from being partially bounced up in the form of dusts and attached to the outer surface of a package at the time of the filling operation of the oxygen-absorbing composition. Especially, the effect of the present invention is more remarkable when the packaging operation is conducted using a three-sided seal automatic filling-packaging machine of rotary-filling type. With the oxygen-absorbing package of the present invention, products can be preserved for a long period of time without any contamination and color change. In particular, the oxygen-absorbing package of the present invention is suitably used for preserving products, such as foodstuffs, beverages, cosmetics, daily commodities and pharmaceutical products, containing substances which form adducts with iron.

What is claimed is:

1. A process for producing an oxygen-absorbing package, which comprises:
   (a) producing an oxygen-absorbing composition comprising a granular iron powder as an effective component which contains fine iron powder passing through a 200-mesh standard sieve in an amount of 5% by weight or less by removing the fine iron powder; and
   (b) packaging the oxygen-absorbing composition in an air-permeable packaging material using a three-sided automatic filling-packaging machine of rotary filling type in a high productivity of at least several hundred packages per minute, wherein amount of the iron powder attached to an outer surface of the oxygen-absorbing package is 0.5 mg/m$^2$ or less with respect to a surface area of the oxygen-absorbing package.

2. The process according to claim 1, wherein the iron powder is a sponge iron powder.

3. The process according to claim 1, wherein the granular iron powder is a coated iron powder prepared by coating an iron powder with an electrolyte in an amount of 0.1 to 10% by weight based on the weight of the iron powder.

4. The process according to claim 3, wherein said coated iron powder is produced by first coating iron powder and then removing the fine iron powder.

5. The process according to claim 3, wherein said coated iron powder is produced by first removing fine iron powder, leaving remaining iron powder, and then coating the remaining iron powder.

6. The process according to claim 5, wherein said coated iron powder is produced by further removing fine iron powder again, after the coating.

7. The process according to claim 1, wherein the removal of the fine iron powder is conducted by screening or separation method utilizing gravity or centrifugal force.

8. The process according to claim 1, wherein said granular iron powder contains fine iron powder passing through a 200-mesh standard sieve in an amount of 3% by weight or less.

9. The process according to claim 1, wherein average particle size of the granular iron powder is 100 to 250 μm.

10. The process according to claim 1, wherein the granular iron powder includes at most 3% by weight coarse iron powder having a diameter larger than 500 μm.

11. The process according to claim 1, wherein said high productivity of said three-sided automatic filling-packaging machine of rotary filling type is in a range of several hundred packages up to 1000 packages per minute.

12. The process according to claim 11, wherein said high productivity is in a range of 400–1000 packages per minute.

13. The process according to claim 1, in which said packaging is performed, using said three-sided automatic filling-packaging machine, by bag-making, metering and filling operations performed arranged around an axis of rotation.

14. The process according to claim 13, wherein said high productivity of said three-sided automatic filling-packaging machine of rotary filling type is in a range of several hundred packages up to 1000 packages per minute.

15. The process according to claim 14, wherein said high productivity is in a range of 400–1000 packages per minute.

* * * * *